United States Patent [19]

Naudin

[11] Patent Number: 4,959,039
[45] Date of Patent: Sep. 25, 1990

[54] TORSION DAMPING DEVICE, IN PARTICULAR FOR A FLYWHEEL TYPE TRANSMISSION OF AN AUTOMOTIVE VEHICLE

[75] Inventor: Jacky Naudin, Ermont, France

[73] Assignee: Valeo, Paris, France

[21] Appl. No.: 451,181

[22] Filed: Dec. 15, 1989

[30] Foreign Application Priority Data

Dec. 28, 1988 [FR] France .................. 88 17339

[51] Int. Cl.[5] ................. F16D 3/14; F16F 15/12
[52] U.S. Cl. ........................ 464/66; 74/574; 192/106.2
[58] Field of Search .............. 464/66, 68; 74/574; 192/106.2

[56] References Cited

U.S. PATENT DOCUMENTS

| | | | |
|---|---|---|---|
| 4,440,283 | 4/1984 | Nioloux | 464/68 |
| 4,548,311 | 10/1985 | Lech | 192/106.2 |
| 4,663,983 | 5/1987 | Kobayashi et al. | |
| 4,747,801 | 5/1988 | Chasseguet | 464/66 |

FOREIGN PATENT DOCUMENTS

| | | |
|---|---|---|
| 0086335 | 8/1983 | European Pat. Off. . |
| 0104823 | 4/1984 | European Pat. Off. . |
| 2568648 | 2/1986 | France . |

Primary Examiner—Thomas R. Hannon
Attorney, Agent, or Firm—Charles E. Brown; Charles A. Brown

[57] ABSTRACT

A torsion damping device for an automotive vehicle includes two coaxial parts which are mounted for rotation relative to each other. One of these coaxial parts has through openings and the other incorporates a number of arms, and main resilient members mounted in these through openings bear circumferentially on insert members, being arranged to act through the latter against the arms. Centering members are also provided between two adjacent main resilient members. The centering member comprises a spacer member extending between two of the through openings, together with a resilient member acting between the spacer member and the corresponding arm. The spacer member is divided into two centering fingers, separate from each other but with the resilient centering member extending from one of the centering fingers to the other.

9 Claims, 1 Drawing Sheet

U.S. Patent
Sep. 25, 1990
4,959,039
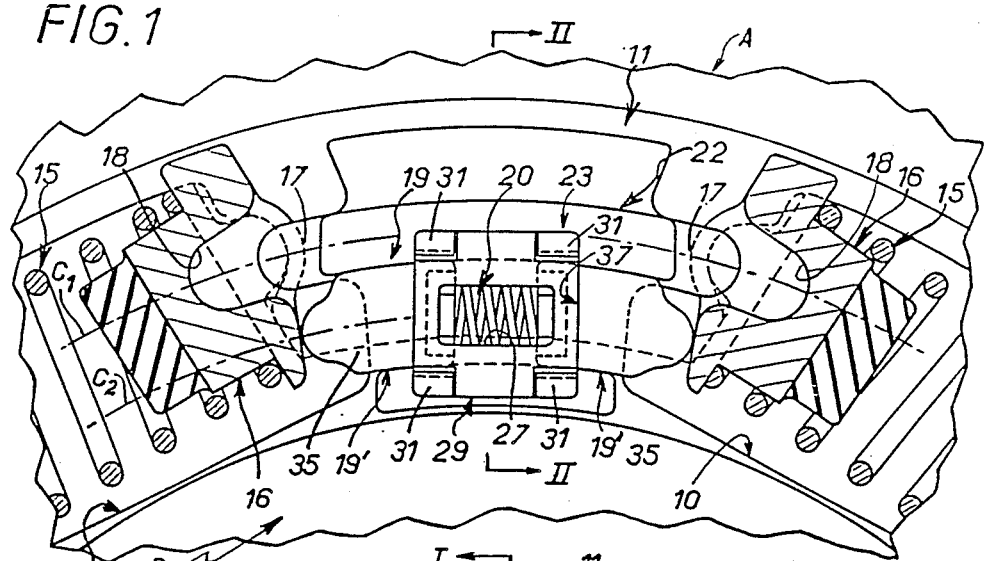
FIG.1
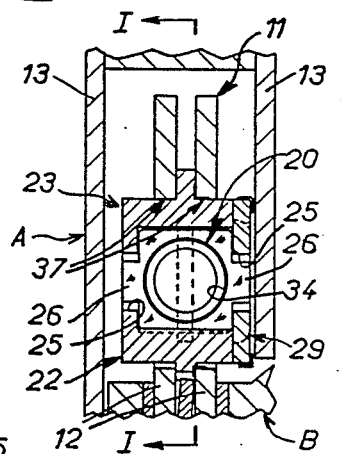
FIG.2
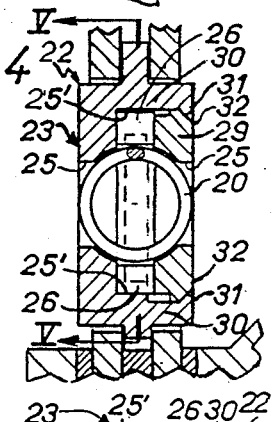
FIG.4
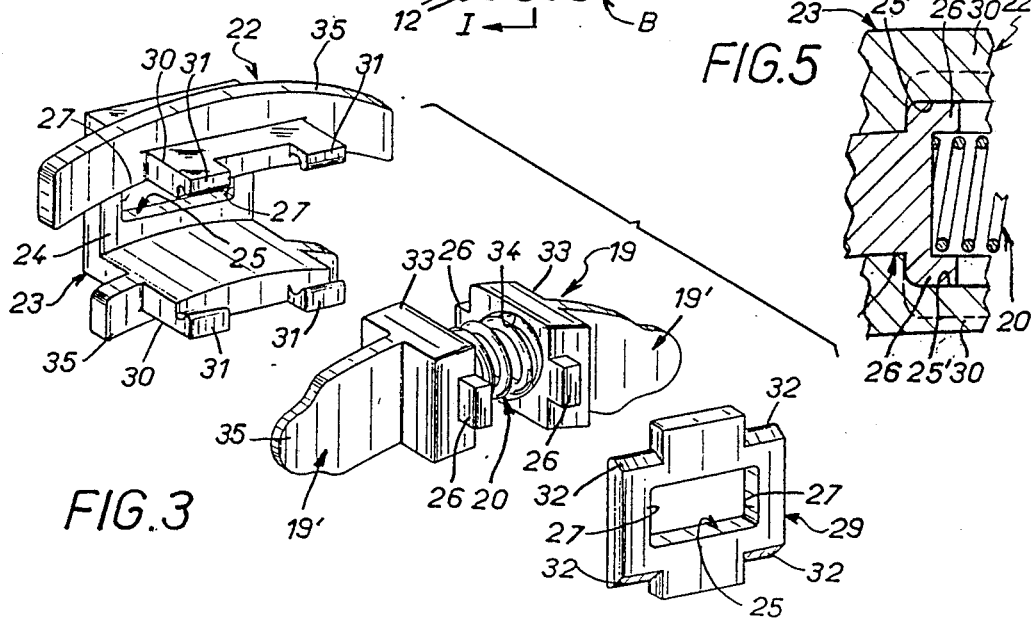
FIG.3
FIG.5

4,959,039

TORSION DAMPING DEVICE, IN PARTICULAR FOR A FLYWHEEL TYPE TRANSMISSION OF AN AUTOMOTIVE VEHICLE

FIELD OF THE INVENTION

This invention relates to a torsion damping device of the kind comprising two coaxial parts which are mounted so as to be rotatable with respect to each other within the limits of a predetermined angular displacement, together with a plurality of resilient members, each of which is disposed individually in through openings formed in one of the coaxial parts, for engagement either directly, or indirectly through insert members against which they bear circumferentially at their ends, with arms which are formed in the other one of the said coaxial parts alternately (considered in a circumferential sense) with the said through openings.

BACKGROUND OF THE INVENTION

U.S. Pat. No. 4,747,801, and the corresponding French published patent application No. 2 593 252A, describe a torsion damping device of the general kind defined above, and to which the present invention is particularly directed. In that arrangement, in order to provide a circumferential clearance on either side of the arms forming part of one of the coaxial parts, in the unstressed state of the assembly, centering means are associated with at least one of those arms. The, or each, centering means comprise a spacer member extending circumferentially between two successive ones of the through openings which accommodate the resilient members (known as the "main" resilient members), and, acting between this spacer member and the associated arm, a resilient centering member having a stiffness which is relatively low compared with that of the main resilient members.

In the above mentioned United States patent, the main resilient members bear circumferentially at their ends on insert members, and the circumferential spacer member extends integrally from one of these insert members to the other. In addition, the arm concerned carries pivot fingers which extend circumferentially for engagement with the insert members, which are formed with cavities to receive the pivot fingers for this purpose. The circumferential spacer member extends along the same circumference as these pivot fingers. It thus extends from the bottom of the cavity of one of the insert members to the bottom of the cavity in the other. As a result, it is necessary to move the insert members away from each other in order to insert the spacer member in place, and this also entails moving the main resilient members, bearing on the insert members, further apart. Given that these main resilient members are relatively stiff, the assembly operation is thereby made somewhat difficult.

SUMMARY OF THE INVENTION

An object of the invention is to provide a torsion damping device of the kind defined above, in which this difficulty is overcome while also giving other advantages.

According to the invention, such a torsion damping device is characterised in that the circumferentially extending spacer member of the centering means is divided into two separate centering fingers, with one centering finger corresponding to each of the associated through openings, and further, in that the resilient centering member of the centering means extends between one of the said centering fingers and the other. With this arrangement, in order to fit the centering fingers into position, it is sufficient to move these two fingers closer to each other. Although this operation, if performed, does involve compressing the resilient centering member which is disposed between the centering fingers, this resilient member is of relatively low stiffness so that the operation is very easy.

Indeed, it is possible to avoid even this compression of the resilient centering member. Thus, in accordance with one embodiment of the invention, the centering fingers extend along a circumference corresponding to a diameter which is less than that to which the circumference on which the pivot fingers carried by the arm concerned corresponds. The centering fingers then bear, not on the bottom of the cavity of the insert member, but on the end surface surrounding the cavity.

The assembly operation, besides being facilitated in this way, can then be completed by merely fitting the components together in the axial direction, without any need to move components further apart from each other. This leads to various other advantages, for example the following.

Firstly, the centering fingers act along a circumference of reduced diameter, leading to a reduction in inertia.

In addition, when the insert members move pivotally in service, and under the influence of centrifugal force, the resilient centering member which acts between the centering fingers (and which is compressed up to that point but thereafter plays no further part in the operation of the assembly as its intervention is limited to the decelerating mode) becomes to a greater or lesser extent relaxed. This improves its useful working life.

A further advantage is that, since the centering fingers extend along a circumference corresponding to a diameter which is different from that corresponding to the circumference of the median axis of the main resilient members, the centering fingers may if desired be arranged to act directly on the main resilient members themselves, with the advantage that it is then no longer necessary to provide any insert members at the ends of the latter.

Finally, in accordance with a preferred feature of the invention, the centering fingers are mounted for sliding movement in a support member which includes abutment means for engaging the centering fingers in a sense opposed to the resilient centering member, in such a way that the centering fingers form a unitary sub-assembly with the support member and the resilient centering member. Fitting the centering means is thus facilitated still further.

The features and advantages of the invention will appear from the description that follows, which is given by way of example and with reference to the accompanying drawings.

BRIEF DESCRIPTION OF THE DRAWINGS

FIG. 1 is a view in transverse cross section showing part of a torsion damping device according to the invention, with the cross section being taken partly on the broken line I—I in FIG. 2, and partly in a transverse mid-plane which is approximately coincident with the plane represented by the line I—I.

FIG. 2 is a partial view in axial cross section, taken on the line II—II in FIG. 1.

FIG. 3 is an exploded perspective view showing the components of a centering means of the torsion damping device.

FIG. 4 is a view in axial cross section, similar to FIG. 2 but showing a further embodiment.

FIG. 5 is a partial view in transverse cross section, showing a detail of the embodiment shown in FIG. 4, the section being taken on the line V—V in FIG. 4.

DESCRIPTION OF THE PREFERRED EMBODIMENTS

The drawings show two embodiments of the application of the invention to a flywheel in the transmission of an automotive vehicle. The torsion damping device is part of this flywheel, and is of the same kind as that which is described in French published patent application No. FR 2 593 252A; with only those elements thereof which are necessary for an understanding of the present invention being described in detail here.

The torsion damper generally consists of two coaxial parts A and B, which are mounted for rotational movement of one relative to the other within the limits of a predetermined angular displacement. The part A includes a plurality of through openings 10, while the other part B includes a plurality of arms 11, spaced apart circumferentially and arranged alternately with the through openings 10 of the part A. Only one of the arms 11 can be seen in FIG. 1, between two of the through openings 10. Each arm 11, as can be seen from FIG. 2, is in fact double, as it constitutes a radial extension of two parallel, annular damper plates 12 which are included in the part B. Similarly, the through openings 10 are double, being formed in two parallel, annular plates 13 of the part A, which are the plates conventionally referred to as guide rings. The guide rings 13 are spaced from, and enclose between them, the damper plates 12.

A plurality of main resilient members 15 extend circumferentially so as to act between the two parts A and B. In this example the members 15 are springs of relatively high stiffness constituting the damping springs. Each spring 15 is disposed individually in a respective pair of the through openings 10 in the part A, and carries at its ends insert members 16 through which it bears circumferentially on the arms 11 of the part B. These insert members 16 are commonly referred to as rockers, because in operation they are arranged to execute some rotating movement. For engagement with the rockers 16, the arms 11 are provided with fingers 17 which will here be referred to as pivot fingers. The pivot fingers 17 are carried on either side of the arms 11, and each rocker 16 has a corresponding blind cavity 18 on the side thereof facing away from the springs 15. The median axis of the springs 15 extends along a circumference indicated in phantom lines at $C_1$, which is coincident with the median axis along which the fingers 17 extend. FIG. 1 shows the unstressed or relaxed condition, in which the fingers 17 are spaced away from the bottoms of the corresponding cavities 18. It is only in operation that, following the angular displacement of the parts A and B relative to each other in either one direction or the other, the fingers 17 come into engagement with the bottoms of the appropriate cavities 18. This brings the arms 11 into engagement with the main damping springs 15.

Centering means are associated with at least one of the arms 11, and in this example are associated with each one of the latter. Each centering means is adapted to maintain the associated arm 11, in the relaxed condition, spaced away from each of the rockers 16 between which the arm lies. These centering means are also arranged respectively between each of the through openings 10 and the next, and each centering means includes a spacer member 19 and a resilient centering member 20 which acts between the corresponding spacer 19 and arms 11. In this example, the circumferential spacer 19 is disposed between the rockers 16, while the resilient member 20 is a spring of relatively low stiffness, referred to here as a centering spring. The spacer 19 is divided into two separate centering fingers 19', with one of the latter for each spacer member 19 being associated with each through opening 10 and therefore with each rocker 16. The centering spring 20 extends between the two centering fingers 19'.

In this example, the centering fingers 19' follow a circumference $C_2$, corresponding to a diameter different from that of the circumference $C_1$ which is followed by the median axis of the main resilient members 15, and is in practice smaller than the latter. In this way the fingers 19' bear against the surface of each rocker 16 that surrounds the cavity 18 of the latter, being thereby spaced from the cavity 18.

The fingers 19' are also mounted, for sliding movement against the action of the spring 20 lying between them, in a support member 22 which is provided with abutment means 27 for this purpose. The arrangement is such that the centering fingers 19', the support member 22 and the resilient centering member 20 together form a unitary subassembly which is shown by itself in the exploded view of FIG. 3. The spring 20 may be mounted in the support member 22 with or without precompression, it being understood that improved damping of dead center noise is obtained if it is not precompressed when being assembled.

Again in this example, the support member 22 includes a U-shaped body 23, the middle part 24 of which extends parallel to the associated arms 11. At least one opening 25 is formed in the middle part 24, with a lug 26, formed on each one of the centering fingers 19', engaging in the opening 25. The ends of the opening 25 thus provide abutment means 27 for the fingers 19'. For example, and as shown in FIGS. 1 to 3, the opening 25 is in the form of a circumferentially extending through hole formed in the middle part 24.

The support member 22 further includes, in this example, a cover piece 29, which extends parallel to the middle part 24 of the body 23 at the free ends of two wing portions 30 which forms the arms of the U-shaped body 23. The cover piece 29, like the middle part 24 of the body 23, has an opening 25 in the form of a through hole, in which another lug 26 of each of the centering fingers 19' is engaged, with the ends of the said through hole 25 thus constituting a further abutment means 27 for the fingers 19' as before. The through holes 25 are aligned with each other, extending substantially tangentially to the circumference $C_1$, and are of rectangular profile.

The cover piece 29 is fastened by a snap fit to the U-shaped body 23: for example (FIGS. 1 to 3), each of the wing portions 30 of the latter has two hook shaped projections 31 spaced apart from each other, while the cover piece 29, which is itself of generally cruciform shape, has corresponding inclined corner notches 32 to engage the hooks 31. Each of the centering fingers 19' includes a generally rectangular head portion 33 whch extends transversely from the middle part 24 to the cover piece 29, with the lugs 26 projecting from the sides of the head portion 33. The latter also has a blind recess 34 to accommodate the centering spring 20. The sliding portion 35 of each finger 19' is generally in the form of a web projecting from the middle of the face of the associated head portion 33 opposite to that in which the spring 20 is housed, and has a generally rounded free end for contact with the associated rocker 16.

The centering fingers 19' are generally curved circumferentially, and for the purpose of guiding these fingers the inner circumferential faces of the support member 22, i.e. those of the wings 30 of its U-shaped body 23, are themselves curved correspondingly. In this example, each of the outer circumferential faces of the support member 22, that is to say those of the wing portions 30, has a web portion 35 which projects radially from its central portion between the radial damper plates 12. These web portions 35 of the support member 22 are also generally curved circumferentially.

In order to improve the guiding of the centering fingers 19', at least one of the latter, and preferably each one, is circumferentially extended so that it projects out of the support member 22 on both sides of the latter, and so as in effect to continue the inner circumferential faces of the support member. That one of these faces which lies on a circumference of greater diameter extends circumferentially a greater distance than the other.

In this example, the support member 22 is mounted in a through opening 37 formed in the arm 11. The opening 37 (which is generally rectangular in profile) extends through each of the damper plates 12. In this way the support member 22, which is maintained axially between the damper plates 12 by means of further web portions 35, itself provides a means for phasing the damper plates 12 with respect to each other. In a modification, there may only be one single damper plate 12, in which case the support member 22 may be carried on this damper plate 12 quite simply by any appropriate means.

In any event, it follows from the foregoing that the operation of assembling the unitary sub-assembly comprising the two components of the support member 22, the centering fingers 19' and the resilient centering member 20, can be carried out by simply fitting them together axially, as also can the subsequent fitting of this unitary sub assembly between the appropriate rockers 16.

The method of operation of the damper assembly in use is generally as described in the above mentioned published French patent application No. FR 2 593 252A (U.S. Pat. No. 4747801): in the unstressed or relaxed condition, the resilient centering spring 20, together with its fellows, effects the required centering of the two coaxial parts A and B with respect to each other. At low torques, the springs 20 are compressed in one direction or the other, following the angular displacement that takes place between the two parts A and B; while at higher torques, when the main resilient members 15 are compressed in their turn once the arms 11 of the coaxial part B come into bearing engagement against one or other of the associated rockers 16, the centering spring 20 itself remains compressed. In any case, when the rockers 16 pivot about their fulcrum points under the influence of centrifugal forces, the resilient centering spring 20 then becomes relaxed to a greater or lesser extent, and is thus preserved to the best advantage.

In the modified embodiment shown in FIGS. 4 and 5, which is more compact in the axial direction, the lugs 26 extend radially and not, as in the previous embodiment, axially. For cooperation with them, the support member 22 is provided with two openings 25' in the form of grooves formed on its inner surface for cooperation with the lugs 26. Each of these grooves is elongated circumferentially and formed on a respective one of the wing portions 30. The through holes defining the openings 25 remain as before for the purpose of receiving the resilient centering member 20. However, in this embodiment there are only two hooks 31 on the U-shaped body 23, and correspondingly only two inclined corner notches 32 are formed on the cover piece 29. These hooks 31 and corner notches 32 act in the central region of the assembly, and the cover plate 29 is thus of H-shaped configuration.

The present invention embraces any variant on the foregoing. In particular, the insert member 16 may be omitted, so that the centering fingers 19' then act directly on the main resilient members 15 and, more precisely, where the members 15 are coil springs, on the end coils of these springs.

What is claimed is:

1. A torsion damping device comprising two coaxial parts, means mounting said coaxial parts for relative rotation with respect to each other, and means defining a predetermined range of angular displacement whereby to limit the extent of said relative rotation, one of said coaxial parts having a plurality of through openings formed therein and the other of the said coaxial parts having arms, the device further including a plurality of main resilient members each of which is disposed in a respective one of the said through openings in said one coaxial part whereby to engage with the said arms either directly or indirectly, the device further including centering means associated with at least one of the said arms, wherein the said centering means include a spacer member, extending circumferentially between two consecutive ones of said through openings of said one coaxial part, and a resilient centering member arranged between the said spacer member and the appropriate said arm, the said spacer member being divided into two centering fingers separate from each other, with one centering finger corresponding to each of the associated said through openings, and with the resilient centering member extending from one of the said centering fingers to the other.

2. A torsion damping device according to claim 1, wherein the main resilient members define a median axis extending along a first circumference, and the said centering fingers extend along a second circumference corresponding to a diameter different from that to which the said first circumference corresponds.

3. A torsion damping device according to claim 2, wherein the centering means further comprises a support member mounting the said centering fingers for sliding movement therein, the support member having abutment means for engaging the centering fingers in a sense opposed to the resilient centering means engaged between the centering fingers, whereby the centering fingers, the said support member, and the said resilient centering member, constitute a unitary sub-assembly.

4. A torsion damping device according to claim 3, wherein the said support member has at least one opening defining end portions of the opening, with each said centering finger having a projecting lug engaged in a said opening of the support member, whereby the said opening end portions constitute a said abutment means for the centering fingers.

5. A torsion damping device according to claim 3, wherein each said arm of a said other coaxial member defines a further through opening mounting a said support member therein.

6. A torsion damping device according to claim 3, wherein the said support member comprises a U-shaped body having a middle part extending parallel to the associated said arm, and a cover piece extending parallel to said middle part.

7. A torsion damping device according to claim 3, wherein the said support member has inner circumferential faces which are curved for the guidance of the said centering fingers.

8. A torsion damping device according to claim 3, further comprising two damper plates and means mounting the said damper plates parallel to each other, the said arms being formed in the damper plates, said support member having outer circumferential faces and, projecting radially from each said outer circumferential face, a web portion extending between the said damper plates.

9. A torsion damping device according to claim 8, wherein at least one of the said web portions is extended circumferentially to project from the support member continuously with the inner circumferential faces of the latter.

* * * * *